(12) United States Patent
Chen

(10) Patent No.: US 7,121,179 B2
(45) Date of Patent: Oct. 17, 2006

(54) ANGLE INDICATOR FOR MITER SAW

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 242 days.

(21) Appl. No.: 10/891,130

(22) Filed: Jul. 15, 2004

(65) Prior Publication Data

US 2005/0268766 A1   Dec. 8, 2005

(30) Foreign Application Priority Data

Jun. 2, 2004   (TW) ............................... 93208750 U

(51) Int. Cl.
*B26D 7/27*   (2006.01)
(52) U.S. Cl. .................. 83/522.16; 83/473; 83/490; 83/522.15; 83/522.17
(58) Field of Classification Search ............... 83/471.3, 83/473, 490, 522.11–522.29; 33/534–538
See application file for complete search history.

(56) References Cited

U.S. PATENT DOCUMENTS

| | | | | |
|---|---|---|---|---|
| 749,976 A * | 1/1904 | Turner | ..................... | 33/401 |
| 2,586,074 A * | 2/1952 | Memluck | ..................... | 33/1 LE |
| 3,538,964 A * | 11/1970 | Berends et al. | ............... | 83/473 |
| 4,731,933 A * | 3/1988 | Cope | ............................. | 33/414 |
| 6,345,448 B1 * | 2/2002 | Chontos | ....................... | 33/339 |
| 6,957,495 B1 * | 10/2005 | Schmillen | ..................... | 33/414 |
| 2005/0199112 A1 * | 9/2005 | Ku et al. | ....................... | 83/473 |

* cited by examiner

*Primary Examiner*—Boyer D. Ashley
*Assistant Examiner*—Carolyn Blake
(74) *Attorney, Agent, or Firm*—Browdy and Neimark, PLLC

(57) ABSTRACT

An angle indicator includes a wheel, a spring member and a rope. The angle indicator is used in a miter saw, which has a worktable, a swivel arm swivelably mounted to the worktable, and a saw blade rotatably mounted to the swivel arm, for indicating a bevel angle of the saw blade relative to the worktable. The wheel is adapted to be pivotally mounted to the worktable of the miter saw and provided with an indication zone. The spring member is adapted to be connected between the worktable and the wheel for providing a return force to the wheel relative to the worktable. The rope has an end adapted to be connected to the swivel arm of the miter saw and the other end connected to the wheel for pulling the wheel to rotate upon movement of the swivel arm relative to the worktable.

20 Claims, 6 Drawing Sheets

ANGLE INDICATOR FOR MITER SAW

BACKGROUND OF THE INVENTION

1. Field of the Invention

The present invention relates to a miter saw and more specifically, to an indicator for use in a miter saw for indicating a bevel cutting angle at where the saw blade of the miter saw cuts a workpiece.

2. Description of the Related Art

FIG. 1 shows a conventional miter saw 1, which comprises a worktable 2, a swivel arm 3 on which a saw blade 4 is rotatably mounted, and an adjustment mechanism 5 connected between the worktable 2 and the swivel arm 3 for enabling the swivel arm 3 to be swiveled relative to the worktable 2. During operation, the operator can adjust the bevel angle of the swivel arm 3 relative to the worktable 2 for cutting the workpiece that is supported on the worktable 2 at different angles.

Further, graduations are made on the periphery of the adjustment device 5, and a pointer is provided at the swivel arm 3. When pivoting the swivel arm 3, the operator can synchronously observe the bevel angle of the swivel arm 3 by means of the indication of the pointer at the graduations.

However, because the adjustment mechanism 5 is connected between the worktable 2 and the swivel arm 3, the swivel arm 3 may keep the operator's sight from the indication of the pointer at the graduations, resulting in an adjustment inconvenience.

SUMMARY OF THE INVENTION

It is the primary objective of the present invention to provide an indicator for a miter saw for indicating a bevel cutting angle of the miter saw, which allows the user to read the indication easily.

It is another objective of the present invention to provide an indicator for a miter saw for indicating a bevel cutting angle of the miter saw, which is simple in structure and is easy and inexpensive to manufacture.

To achieve these objectives of the present invention, the angle indicator for use in a miter saw comprises a wheel, a spring member and a rope. The miter saw has a worktable, a swivel arm swivelably mounted to the worktable, and a saw blade rotatably mounted to the swivel arm. The wheel is adapted to be pivotally mounted to the worktable of the miter saw and provided with an indication zone. The spring member is adapted to be connected between the worktable and the wheel for providing a return force to the wheel relative to the worktable. The rope has an end adapted to be connected to the swivel arm of the miter saw and the other end connected to the wheel for pulling the wheel to rotate upon movement of the swivel arm relative to the worktable. Accordingly, when the user adjusting the angle of the swivel arm relative to the worktable, the wheel rotates along with the movement of the swivel arm by means of the rope, and therefore the user can read the bevel angle of the swivel arm by viewing the indication of the indication zone of the wheel.

The wheel can be installed at various locations of the worktable of the miter saw according to the manufacture's design. For example, in an embodiment of the present invention, the wheel is pivotally mounted to a bottom wall of the worktable of the miter saw and the worktable has a through hole for viewing of the indication zone of the wheel.

In another embodiment of the present invention, the wheel is pivotally mounted to a handle provided at the worktable of the miter saw.

DETAILED DESCRIPTION OF THE INVENTION

Figure 1:
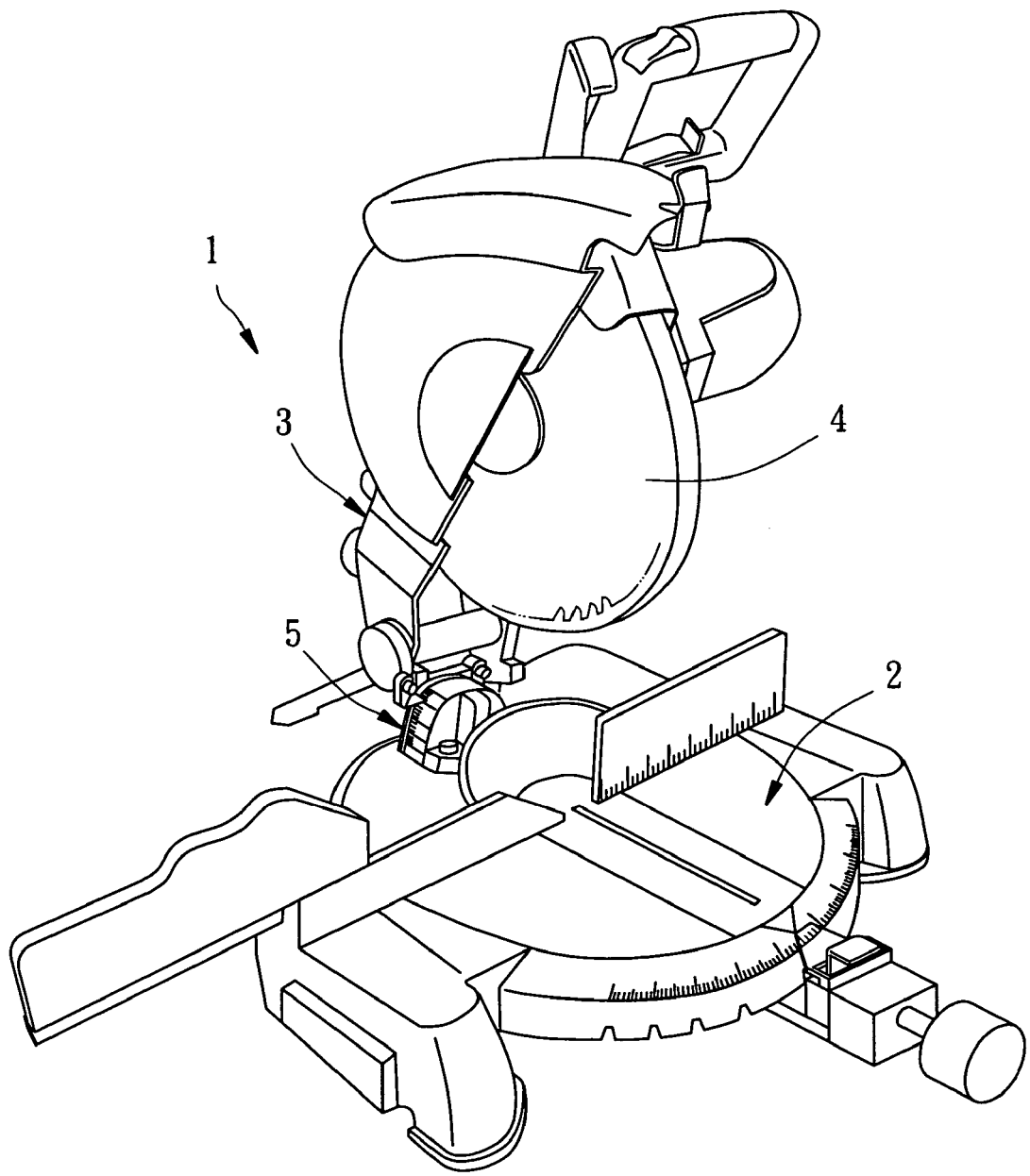
FIG. 1 is a perspective view of a miter saw constructed according to the prior art.
Figure 2:
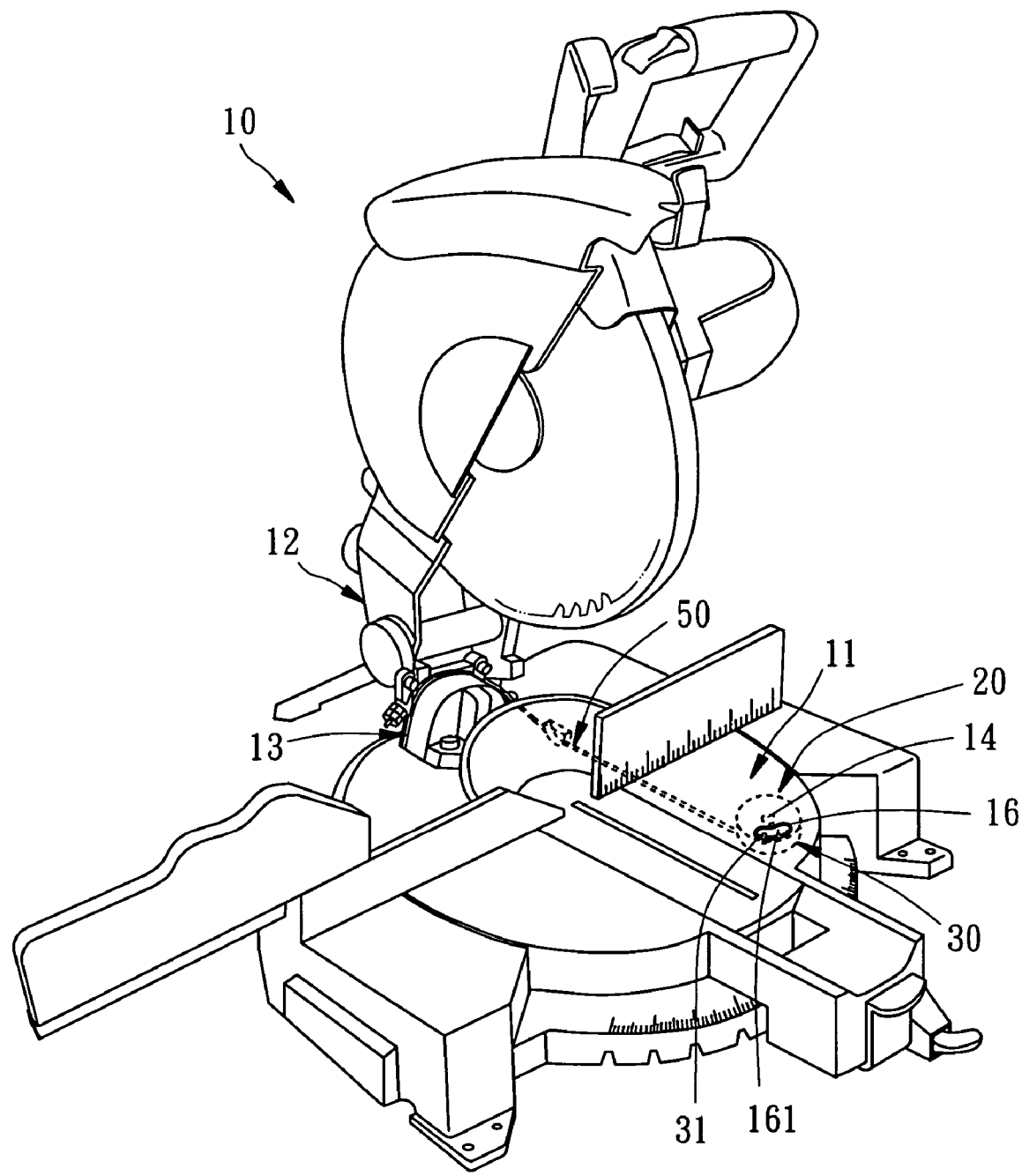
FIG. 2 is a perspective view of a miter saw constructed according to the present invention.
Figure 3:
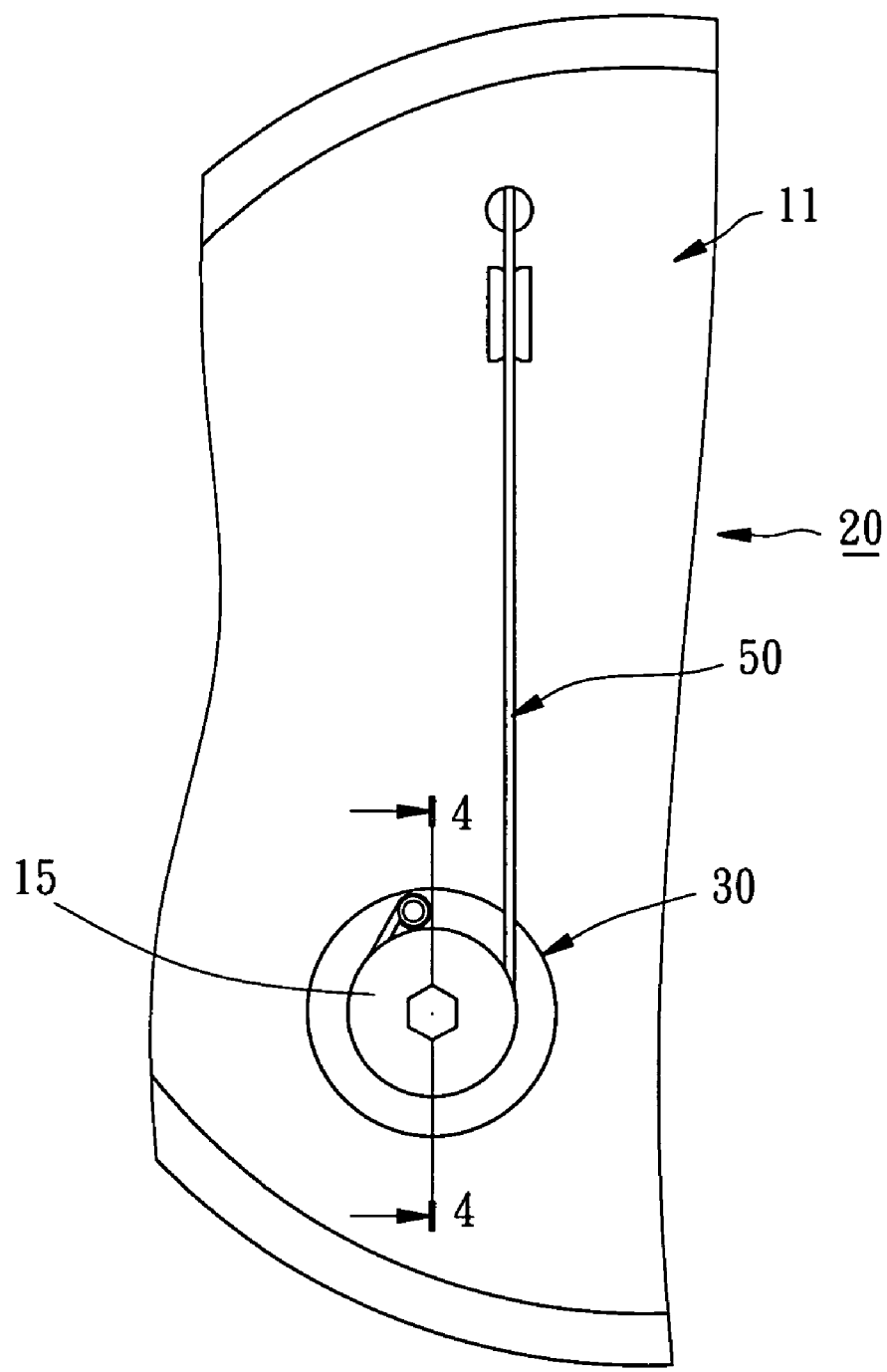
FIG. 3 is a bottom view in an enlarged scale of a part of FIG. 2., showing the arrangement of the angle indicator.
Figure 4:
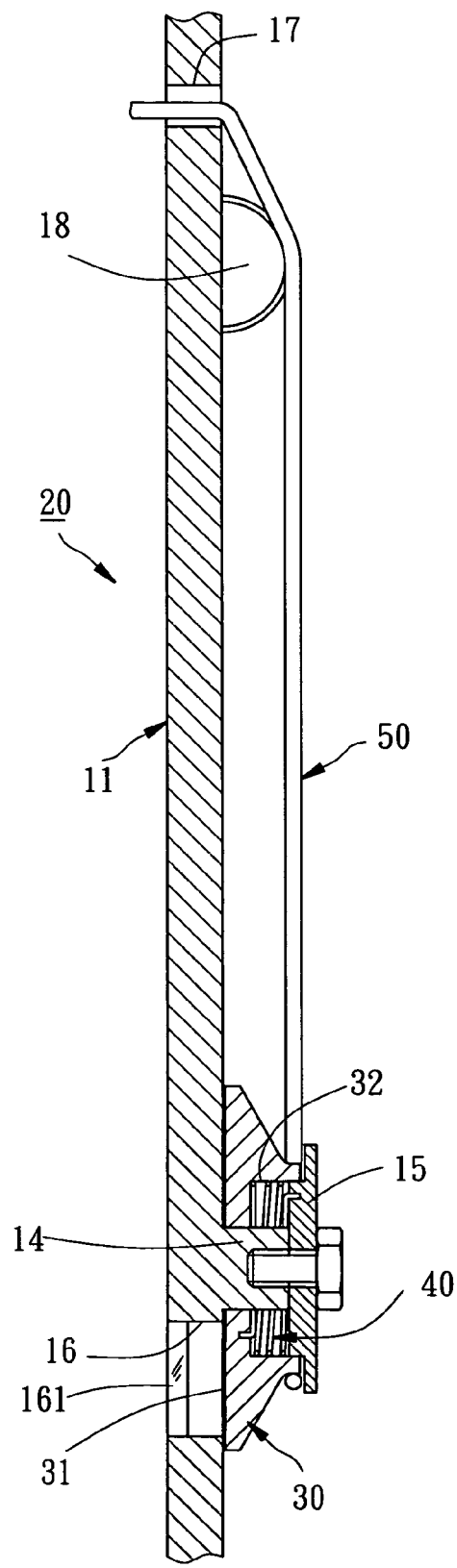
FIG. 4 is a sectional view of the angle indicator according to the present invention.

Referring to FIGS. 2–4, an angle indicator 20 is shown installed in a miter saw 10. The miter saw 10 comprises a worktable 11, a swivel arm 12, and an adjustment mechanism 13 connected between the worktable 11 and the swivel arm 12 for enabling the swivel arm 12 to be pivoted relative to the worktable 11. The angle indicator 20 comprises a wheel 30 rotatably mounted on the bottom wall of the worktable 11, a spring member 40 provided between the wheel 30 and the worktable 11, and a rope 50 connected between the swivel arm 11 and the wheel 30.

The wheel 30 is rotatably mounted on a pivot 14 that extends downwards from the bottom wall of the worktable 11. A disk 15 is affixed to the pivot 14 to hold the wheel 30 in place, for enabling the wheel 30 to be rotated on the pivot 14. The wheel 30 has an indication zone 31 formed of graduations in one side thereof and facing the bottom wall of the worktable 11. The worktable 11 has a through hole 16 corresponding to the indication zone 31. The through hole 16 is covered with a transparent covering 161 that prevents falling of cut chips on the indication zone 31, so that the indication zone 31 can be seen through the transparent covering 161.

The spring member 30 is mounted in a recessed hole 32 in one side of the wheel 30 opposite to the indication zone 31 and connected between the wheel 30 and the disk 15 to provide a torsional return force upon rotation of the wheel 30 on the pivot 14.

The rope 50, which is made of steel in this embodiment, has one end fastened to the wheel 30, and the other end inserted through a hole 17 in the worktable 11 and fastened to the swivel arm 12. Therefore, when pivoting the swivel arm 12, the rope 50 is forced to turn the wheel 30 about the pivot 14. Further, a circular arched rope guider 18 is provided at the bottom side of the worktable 11 to guide movement of the rope 50.

When the operator is pivoting the swivel arm 12, the rope 50 is forced to turn the wheel 30 about the pivot 14, and therefore the user can read the bevel angle of the swivel arm 12 by viewing the indication of the indication zone 31 at the through hole 16. Because the swivel arm 12 is not in the way between the operator's eyes and the through hole 16 when the operator is operating the miter saw 10, the swivel arm 12 does not keep the user's sight from the indication of the indication zone 31 at the through hole 16.

Further, a guiding roller may be used to substitute for the aforesaid circularly arched rope guider 18, thereby lowering friction resistance.

Figure 5:
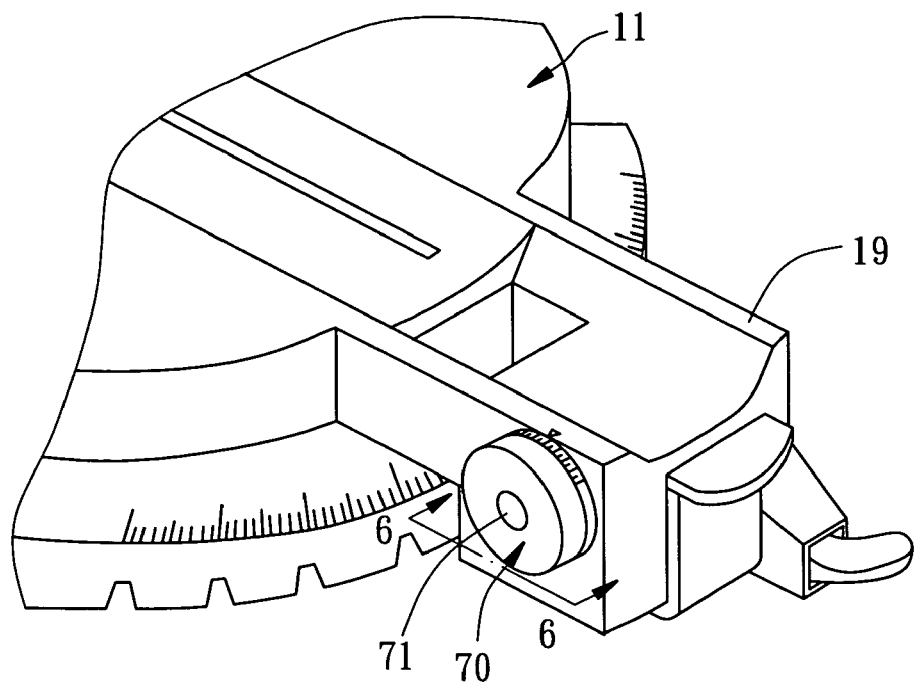
FIG. 5 is a partial respective view, showing an alternate form of the angle indicator according to the present invention.
Figure 6:
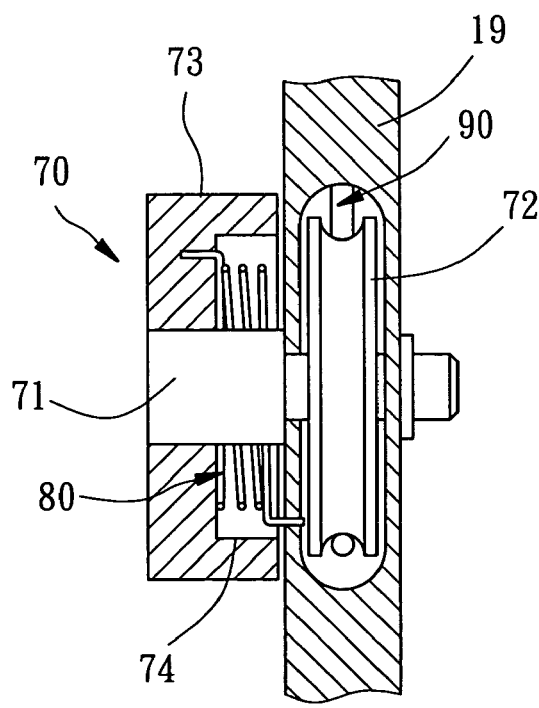
FIG. 6 is a sectional view of the angle indicator shown in FIG. 5.

FIGS. 5 and 6 show an alternate form of the present invention. According to this embodiment, the angle indicator 60 is comprised of a wheel 70, a spring member 80, and a rope 90. The wheel 70 is rotatably mounted to a handle 19 at the worktable 11 with a pivot 71, having an indication zone 73 formed of graduations in the periphery thereof. The other end of the pivot 71 is mounted with a roller 72 that is synchronously rotatable with the wheel 70. The spring member 80 is mounted in a recessed hole 74 in one side of the wheel 70, and connected between the wheel 70 and the handle 19. The rope 90 has one end connected to the swivel arm (not shown) and the other end connected to the roller 72.

When the operator adjusting the angle of the swivel arm, the rope 90 is forced to turn the roller 72 and the wheel 70 synchronously, and therefore the operator can know the bevel angle of the swivel arm by means of the indication of the indication zone 73.

Figure 7:
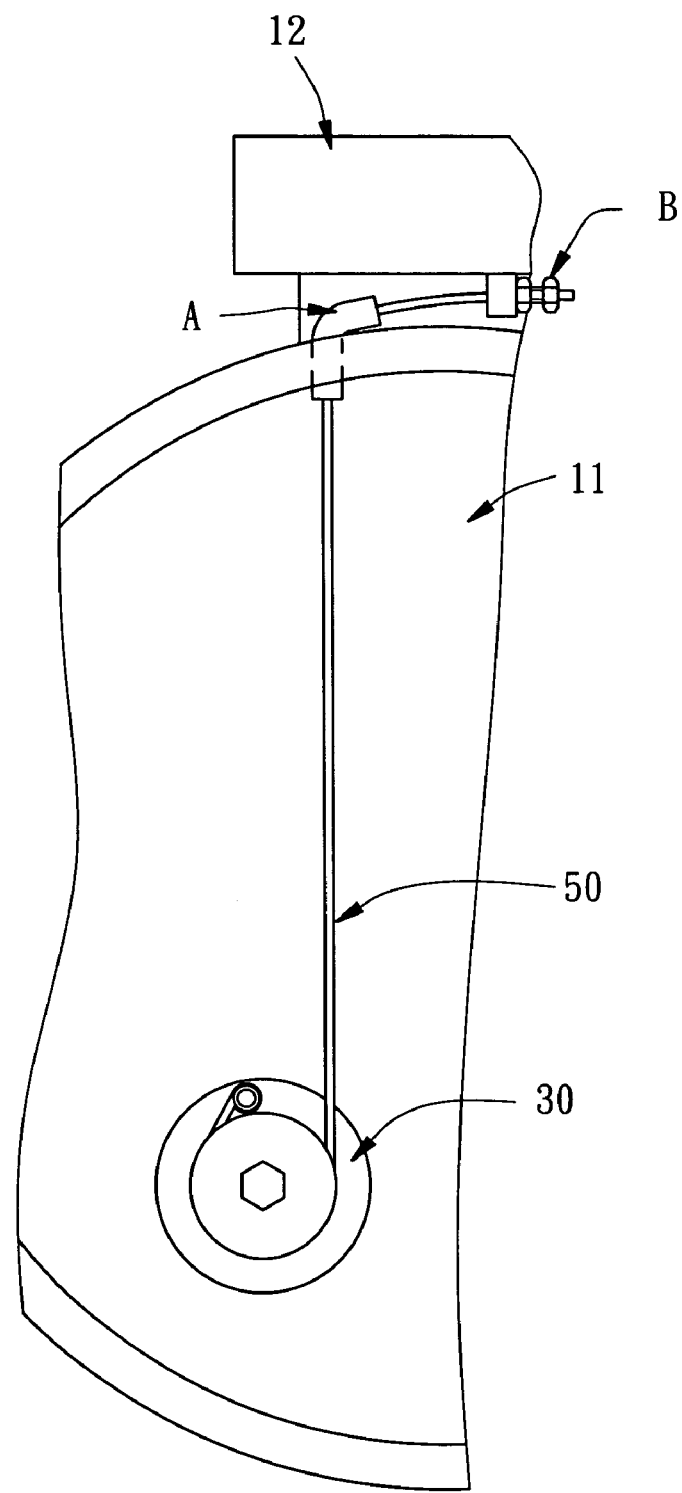
FIG. 7 is a schematic drawing showing the arrangement of another alternate form of the angle indicator in a miter saw according to the present invention.

FIG. 7 shows another alternate form of the present invention. According to this embodiment, the rope 50 has one end connected to the wheel 30, and the other end inserted through a bent guiding tube A in the rear sidewall of the worktable 11 and then connected to the swivel arm 12 through a tension adjustment screw B that can be rotated to adjust the tension of the rope 50.

As indicated above, the angle indicator according to the present invention has the following advantages:

1. The invention automatically indicates the bevel angle of the swivel arm during operation of the miter saw, and the swivel arm does not keep the operator's sight from the indication.

2. The wheel of the angle indicator can be installed in any of a variety of positions in the worktable subject to the model of the miter saw.

3. The angle indicator is easy and inexpensive to manufacture, and effectively improves the working efficiency of the miter saw.

Although particular embodiments of the invention have been described in detail for purposes of illustration, various modifications and enhancements may be made without departing from the spirit and scope of the invention. Accordingly, the invention is not to be limited except as by the appended claims

What is claimed is:

1. An angle indicator and a miter saw having a worktable, a swivel arm swivelably mounted to the worktable, and a saw blade rotatably mounted to the swivel arm, and for indicating a bevel angle of the saw blade relative to the worktable, said angle indicator comprising:
   a wheel pivotally mounted to the worktable of the miter saw, said wheel having an indication zone;
   a spring member connected between the worktable of the miter saw and said wheel for providing a return force to said wheel relative to the worktable of the miter saw; and
   a rope having an end connected to the swivel arm of the miter saw and the other end connected to said wheel for pulling said wheel to rotate upon movement of the swivel arm of the miter saw relative to the worktable of the circular.

2. The angle indicator as claimed in claim 1, wherein said wheel is adapted to be pivotally mounted to a bottom wall of the worktable of the miter saw; the worktable of the miter saw has a through hole for viewing of the indication zone of said wheel.

3. The angle indicator as claimed in claim 2, wherein said through hole is covered with a transparent covering.

4. The angle indicator as claimed in claim 2, wherein said wheel is adapted to be pivotally mounted to a pivot that extends downwards from the bottom wall of the worktable of the miter saw.

5. The angle indicator as claimed in claim 4, wherein said pivot has a distal end fixedly mounted with a disk.

6. The angle indicator as claimed in claim 1, wherein said wheel is adapted to be pivotally mounted to a handle provided at the worktable of the miter saw.

7. The angle indicator as claimed in claim 6, wherein said indication zone is formed on a periphery of said wheel.

8. The angle indicator as claimed in claim 6, wherein said wheel has a pivot adapted to be pivotally mounted to the handle of the miter saw.

9. The angle indicator as claimed in claim 8, wherein said pivot of said wheel has an end mounted with a roller for synchronous rotation with said wheel.

10. The angle indicator as claimed in claim 1, wherein said wheel has a recessed hole in a center of one side thereof for accommodating said spring member.

11. The angle indicator as claimed in claim 1, further comprising a rope guider adapted to be mounted to the worktable of the miter saw for guiding the movement of said rope.

12. The angle indicator as claimed in claim 1, further comprising a rope guiding roller adapted to be rotatably mounted to the worktable of the miter saw for guiding the movement of said rope.

13. The angle indicator as claimed in claim 1, further comprising a guiding tube adapted to be mounted to the worktable of the miter saw for insertion of said rope.

14. The angle indicator as claimed in claim 1, wherein said indication zone is formed of graduations.

15. A miter saw comprising:
   a worktable;
   a swivel arm swivelably mounted to the worktable;
   a saw blade rotatably mounted to the swivel arm; and
   an angle indicator for indicating a bevel angle of the saw blade relative to the worktable, the angle indicator comprising:
      a wheel pivotally mounted to the worktable, said wheel having an indication zone;
      a spring member connected between the worktable and the wheel for providing a return force to the wheel relative to the worktable; and
      a rope having an end connected to the swivel arm and the other end connected to the wheel for pulling the wheel to rotate relative to the worktable when a user swivels the swivel arm relative to the worktable.

16. The miter saw as claimed in claim 15, wherein the wheel is pivotally mounted to a bottom wall of the worktable and the worktable has a through hole for viewing of the indication zone of the wheel.

17. The miter saw as claimed in claim 15, wherein the wheel has a pivot pivotally mounted to the worktable; said pivot of the wheel having an end mounted with a roller connected with the other end of the rope for synchronous rotation with the wheel.

18. The miter saw as claimed in claim 15, further comprising a rope guider mounted to the worktable for guiding movement of the rope.

19. The miter saw as claimed in claim 15, further comprising a rope guiding roller rotatably mounted to the worktable for guiding movement of the rope.

20. The miter saw as claimed in claim 15, further comprising a guiding tube mounted to the worktable for insertion of the rope.

* * * * *